May 4, 1965  B. A. BARENGOLTZ  3,181,342
OIL GAUGE WITH TESTING FACILITY
Filed Sept. 26, 1961  3 Sheets-Sheet 1

INVENTOR.
Bernard A. Barengoltz
BY James V. Ryan
Attorney

INVENTOR.
Bernard A. Barengoltz
BY
James T Ryan
Attorney

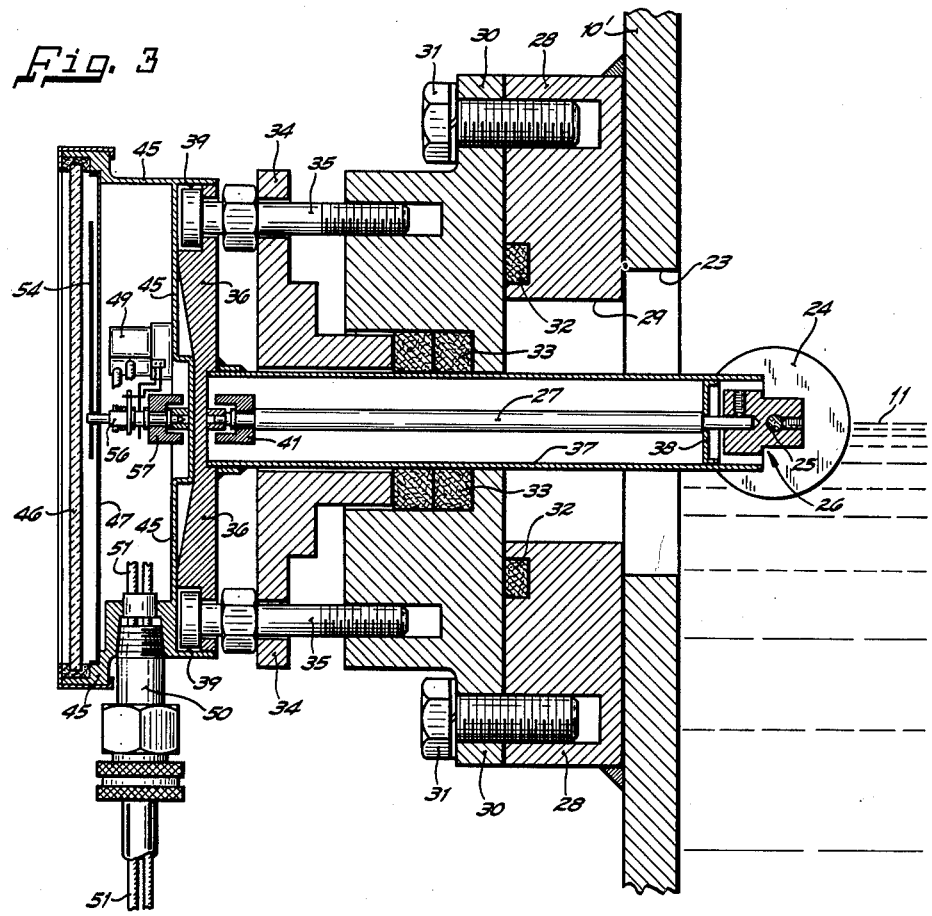

3,181,342
OIL GAUGE WITH TESTING FACILITY

Bernard A. Barengoltz, Pittsburgh, Pa., assignor to Mc-Graw-Edison Company, Milwaukee, Wis., a corporation of Delaware
Filed Sept. 26, 1961, Ser. No. 140,931
7 Claims. (Cl. 73—1)

This invention relates generally to improvements in liquid level indicators and more particularly to an improvement in those type devices which incorporate an alarm circuit.

When the liquid level of a device is critical enough to warrant the inclusion of a liquid level gauge having an alarm circuit it becomes relatively necessary to test the operability of the alarm circuit from time to time in order to be sure that when an abnormal liquid level condition occurs the alarm circuit is capable of indicating this. In some cases the alarm circuit may be tested by merely creating the abnormal liquid level. Undoubtedly this method is sufficient for many applications. However in the case of liquid containing transformer tanks it is most unfeasible. For lack of a better method, however, the alarm circuitry of devices of the above described type has been heretofore tested in this manner. To accomplish this test, tanks, valves and considerable extra piping are required. The procedure is consequently involved, prone to mistakes and results in introduction of air to the transformer tank as well as depletion of the oil within the tank.

As a result of the inherent drawbacks of this method a new and improved structure and method of testing alarm contacts has been needed in the industry for some time. It has consequently been my thought that if conventional liquid level gauges could be modified in some manner so as to have a testing capability that this vexacious problem could be solved.

It is therefore an object of this invention to provide an improved liquid level gauge which has an alarm testing capability and which is particularly applicable to fluid filled transformers.

Another object of this invention is to provide a liquid level gauge which adequately performs its indicating function while at the same time having a capability such that the alarm circuitry may be tested.

A further object of this invention is to provide an inexpensive level indicating gauge which is operable to simulate an abnormal fluid level condition.

A still further object is to provide a method of testing the alarm circuit in a liquid level gauge which does not involve the letting of liquid or the introduction of air to the liquid container.

Other objects and advantages of my invention will be apparent from the following description of the preferred embodiments of the invention taken in connection with the accompanying drawings in which:

FIG. 3 is a cross-sectional view of FIG. 2 taken along lines 3—3 and containing the improvement hereinafter described.

Figure 1:
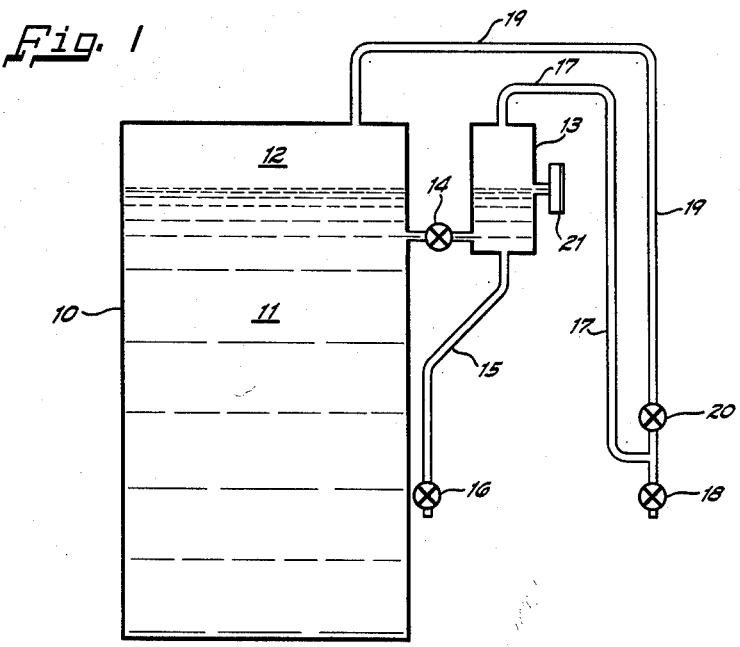
FIG. 1 is a view in elevation of the conventional mechanism for testing the operability of a liquid level gauge.
Figure 4:
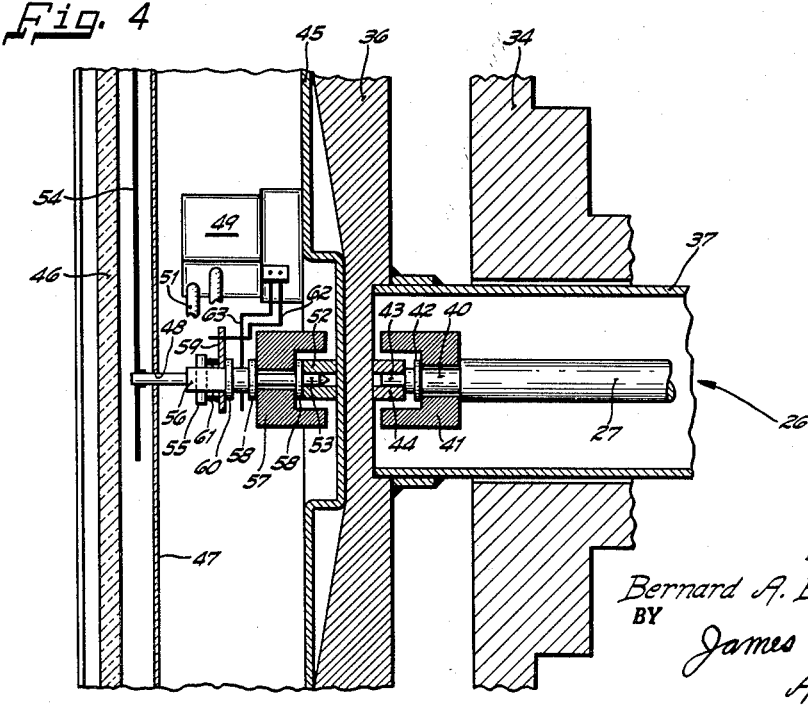
FIG. 4 is an enlarged view of a portion of FIG. 3 showing the abnormal liquid level simulating mechanism.

Referring now to FIG. 1, 10 indicates a transformer tank having a liquid 11 (oil for example) contained therein. As is usual a gas 12 fills the space above the oil. A test tank 13 which communicates with the interior of the transformer tank 10 through a valve 14 is situated in such a manner that the level of the oil within the test tank 13 is the same as the level of the oil in the transformer tank 10. A pipe 15 projects out of the bottom of the test tank 13 and terminates in a valve 16. A second pipe 17 extends out of the top of the test tank 13 and terminates below the test tank in a valve 18. An oil level gauge 21 is shown illustratively in conjunction with the test tank 13. A pipe 19 communicates with the top of the tank 10 and valve 18. Intermediate the ends of the pipe 19 a valve 20 is situated.

During normal transformer operation care must be taken that valves 16 and 18 are closed and that valves 14 and 20 are open so as to obtain a common oil volume and gas space as between the transformer tank 10 and the test tank 13. To test the gauge 21 the following steps must be performed.

(1) Close valve 14 to isolate oil in test tank
(2) Close valve 20 to isolate gas space in test tank
(3) Open valve 18 to vent gas space in test tank
(4) Slowly open valve 16 to drain oil from test tank to approximate a low oil level condition.

The above system in addition to being relatively complicated from a structural and operational point of view also involves the loss of approximately one gallon of oil and the inclusion of approximately 500 cubic inches of air into the main tank (transformer tank) per operation. The foregoing discussion is not engaged in to belittle the prior art but rather to point out the advantages of the invention over the prior art.

Referring now to FIGURES 2-4, 10' illustrates a transformer tank wall having an aperture 23 therein. Situated within the transformer wall is a float 24 having a float arm 25 which is operatively connected to a motion translating mechanism 26 of the conventional type. A drive shaft 27 which is responsive to float fluctuation is operatively connected at one end to the mechanism 26 and extends outwardly of the tank thru the aperture 23. A mounting flange 28 having a large central aperure 29 is welded or otherwise affixed to the tank wall 10'. A packing gland 30 which may be constructed of any conventional packing material is affixed to flange 28 by means of bolt(s) 31. A circular gasket 32 which may be of rubber is positioned between mounting flange 28 and gland packing 30 to positively prevent oil from passing therebetween. Tightening of the bolt(s) 31 serves to properly seat and compress the gasket 32.

Associated with a portion of the gland 30 are one or more packing rings 33 whose function will hereinafter be explained. A gland follower 34, which like the packing gland 30 and flange 28 has a central aperture, is positioned adjacent the packing rings 33 and in contact therewith so that any force exerted on the follower 34 serves to compress the packing rings 33.

Affixed to the gland follower 34 and packing gland 30 as by bolt(s) 35 is a non-magnetic partition 36. The non-magnetic portion 36 has a projecting tube-like portion 37 which may be integral therewith and which passes thru the apertures in members 34, 30, 28 and 10'. The portion 37 surrounds the drive shaft 27. A shaft supporting member 38 may be positioned within the confines of portion 37 so as to properly position the shaft therewithin. It should be especially noted that the packing rings 33 fit snugly against the periphery of member 37 and that by tightening of bolts 35 the rings create a positive seal between the packing gland 30 and the member 37 thereby preventing the passage of oil therebetween.

The non-magnetic partition 36 has a curvate slot 39 for each of the bolts 35 so that the heads thereof may be received therein. In this manner the partition 36 may be rotated to a degree with respect to the gland follower, gland and flange.

The drive shaft 27 has a reduced diameter portion 40 upon which a permanent driving magnet 41 is fixedly attached as for example by pinning. To further prevent the magnet 41 from moving axially along the shaft 27 it is seated on one side, against the portion of the shaft having the larger diameter and provided with a lock washer nut 42 or similar means on the other side. The end of shaft 27 is provided with a further reduced diameter section 43 which is fitted into a projecting bearing member 44 on partition 36. It can thusly be seen that the magnet and shaft are free to rotate together as a result of fluctuations of the oil level within the transformer.

Affixed to parition 36 (a portion of the housing) is the remainder of the gauge housing which includes an enclosing member 45, a transparent facial member 46 affixed to member 45, and a dial member 47 which is immobile relative to member 45 and which has a central aperture 48 therein.

A microswitch assembly 49 is fixedly attached to the portion of the enclosing member 45 adjacent partition 36. Near the bottom of the enclosing member 45 an entrance fitting 50 is positioned so that flexible alarm lead cables 51 may enter the housing. The cables 51 extend from the microswitch assembly 49 to a suitable alarm which may be a light, bell, buzzer or any similar conventional means but this is not shown in order to facilitate the understanding of the invention and to shorten the disclosure.

Positioned on the enclosing member 45 directly opposite the bearing member 44 is a second bearing member 52. A pointer shaft 53 is rotatably mounted at one end in the bearing 52 and projects at its other extremity thru the central aperture 48 in the dial member 47. An indicating pointer 54 is affixed to the projecting extremity of the shaft 53 and is rotatable therewith.

Figure 2:
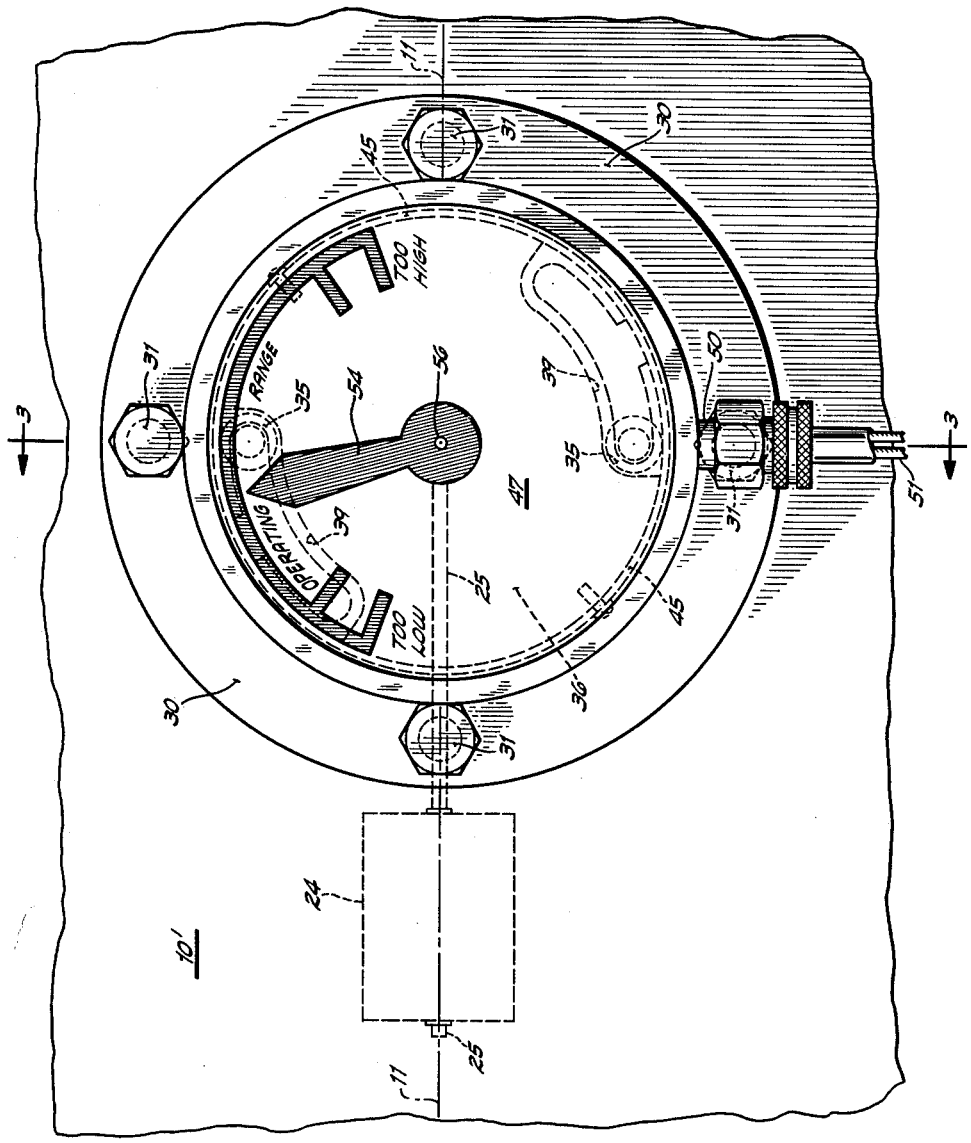
FIG. 2 is a view in elevation of a liquid level gauge.

As shown in FIG. 2 the dial member 47 is calibrated into an operating range, a too low condition, and a too high condition; the calibrations referring to the height of the oil in the transformer tank. As can be seen the relative positioning of the pointer indicates the oil lever condition to the observer.

Surrounding the pointer shaft 53 and pinned thereto via pin 55 is an external shaft 56 upon which a permanent driven magnet 57 is fixedly mounted. The magnet 57 may be retained on the shaft 56 by means of lock washers or nuts 58.

Also positioned upon the shaft 56 in fixed engagement therewith is a contactor member 59. The contactor member may be affixed to the shaft in a variety of manners but I prefer to provide the contactor with a non-concentric aperture thru which the shaft extends. To prevent the contactor 59 from moving axially along the shaft 56 it may be biased between the pin 55 and lock washed 60 by a circular spring member 61.

While there are undoubtedly a variety of ways other than those described for constructing the described structure the important structural features include the fact that the shaft 27 and driving magnet 41 mounted thereon must be responsive to fluctuations of the float while the driven magnet 57 and indicating pointer 54 must be responsive to rotation of the driving magnet. It can readily be seen that the appropriate poles of the driving and driven magnet must be properly aligned so that motion of the driving magnet is duplicated on the other side of the non-magnetic portion 36 by the driven magnet.

Extending from the microswitch mechanism 49 is at least one switch actuator 62 which will function to close the alarm circuit when impinged upon by the contactor 59. Since the generally more dangerous oil condition is too low a level the actuator 62 is positioned in such a manner that it will actuate the microswitch only upon rotation of the shafts in one direction i.e., the direction accompanying a depression of the oil float. A return spring 63 depends from the switch mechanism 49 and has for its purpose the returning of the actuator 62 to its normal position after the abnormal liquid level condition has been remedied.

It is desired that the alarm be actuated on abnormally high and low oil level conditions the return spring 63 may be replaced with a second actuator and the contactor 59 positioned between the two actuators so that excessive rotation of the contactor in either direction will cause operation of the alarm. Alternatively, the one actuator 62 could be designed so that movement in either direction relative to the switch causes actuation of the alarm.

The operation of the device on an abnormal oil level condition will now be explained. The float moves either upwardly of downwardly in response to the oil level. This motion of the float is converted by the motion translating device 26 into rotation of the shaft 27 and the affixed driving magnet 41. Due to the magnetic attraction between the driving and driven magnets 41 and 57 respectively, the shafts 27 and 53 move as one so that the first indication of the abnormal liquid level condition is reflected in movement of the indicating pointer 54 across the dial 47. When the liquid level condition becomes critical the contactor 59 will have rotated a sufficient distance to impinge upon the switch actuator 62 which serves to cause the microswitch mechanism to actuate either an audible or visible alarm. When the abnormal oil level condition is remedied the shafts, magnets and contacts will rotate to their original positions thereby allowing the switch actuator to return to its non-actuating position. This description of the operation of the gauge is in most respects similar to that of conventional gauges and consequently does not form a part of the invention.

As previously mentioned, it becomes necessary from time to time to test whether the alarm will function properly upon abnormal oil or liquid level conditions. Rather than actually create an abnormal condition, as has been the prior art practice, (See FIG. 1) I simulate the condition.

This is accomplished by turning the gauge housing with respect to the shafts, magnets and float. Due to the fact that the non-magnetic partition 36 is slotted, a limited amount of rotation of the housing is possible despite the fact that the bolts 35 join the partition to the gland follower 34 and packing gland 30. Since the tubular projecting member 37 is integral with the partition 36 or otherwise fixedly attached thereto, it too rotates with the gauge. During this rotation of the member 37 the packing rings 33 serve to positively prevent oil from escaping along the periphery of the member 37.

Since the microswitch mechanism is fixed to the gauge housing it rotates therewith. After a sufficient amount of rotation of the gauge the switch actuator 62 will impinge on the contactor 59 which has meanwhile remained stationary on the shaft during this operation due to the magnetic force between the magnets.

Upon engagement of the switch actuator and the contactor the switch actuator will be moved relative to the microswitch causing the alarm circuit to be closed and the alarm to be actuated. If the alarm operates it is an assurance that the alarm will also function in the same manner in response to an abnormal liquid level condition. After testing the alarm circuit in the above manner, the gauge housing may be rotated back to its original position thereby readying the device for normal operation.

It is apparent that there are many inherent advantages in the structure and method of testing above described; the most important being the device's structural and functional simplicity as well as the fact that no liquid is lost or air allowed to enter the transformer by way of testing.

While a particular embodiment of the invention has been shown and described, it will be obvious to those skilled in the art that various changes and modifications can be made therefrom without departing from the invention and, therefore, it is intended for the appended claims to cover all such changes and modifications as fall within the true spirit and scope of the invention.

I therefore claim:

1. In apparatus comprising a closed tank containing a liquid and a liquid level inndicating device of the type having float means which is responsive to liquid level variation, movable indicator means operatively connected to said float means, and alarm means which is normally responsive to relatively extreme fluctuations of said float means; the improvement therein comprising, a gauge housing constructed and arranged in such a manner that it may be rotated with respect to said indicator means, means for mounting said gauge housing on the exterior of said tank so that it is normally stationary but may be rotated relative to said tank, alarm actuating means affixed to said gauge housing, and means fixedly associated with said indicator means and movable therewith for normally activating said alarm actuating means, wherein testing of said alarm means is accomplished by rotating said gauge housing with respect to said tank and to said indicating means to thereby cause said alarm actuating means to be activated by said means fixedly associated with said indicator means.

2. In apparatus comprising a liquid-containing enclosure having means for indicating the liquid level including liquid level responsive float means within said enclosure, movable indicator means outside said enclosure by operatively connected to said float means for indicating the liquid level within said enclosure, and alarm means responsive to extreme fluctuation of said float means to provide an indication of particularly abnormal liquid level conditions; the improvement therein comprising, a housing having at least a portion thereof which is capable of movement with respect to said enclosure and to said indicator means, alarm actuating means fixedly attached to that portion of said housing which is capable of movement, and means affixed to said indicator means and movable therewith for normally energizing said alarm actuating means incident to a particularly abnormal liquid level condition, whereby simulation of a particularly abnormal liquid level condition, for test purposes, is accomplished by moving relative to said enclosure and to said indicating means said portion of said housing which is capable of movement to move said alarm actuating means into contact with said means affixed to said indicator means and thereby energize said alarm means.

3. In an electrical transformer containing an insulating dielectric liquid and having a magnetic liquid level gauge of the type including a liquid level responsive float member, visible indicator means operatively connected to said float and responsive to movement thereof, and alarm means responsive to relatively large fluctuations of said float for indicating the presence of particularly abnormal liquid level conditions; the improvement therein comprising, a housing for enclosing said visible indicator means having a first portion thereof which is fixed with respect to said transformer and a second portion which is normally fixed relative to said first portion but which is capable of movement with respect to said first portion and to said indicating means, an alarm actuating switch affixed to said second portion of said housing, and means interconnected to said indicator means and movable therewith for activating said switch upon excessive fluctuation of said float, whereby movement of said second portion of said housing relative to said indicator means and to said first portion of said housing causes said switch to contact said interconnecting means thereby activating said alarm means and insuring that said alarm means is competent to indicate an abnormal liquid level condition.

4. In an electrical transformer having a tank containing an insulating dielectric liquid and a liquid level gauge of the type including a float member, indicator means operatively connected to said float member and responsive to movement thereof, and alarm means for indicating abnormally large fluctuations of said float member; the improvement therein comprising, a gauge housing having a first portion which is fixed relative to said transformer tank and a second portion which is normally stationary relative to said first portion but which is capable of movement with respect to said first portion and to said indicator means, alarm means mounted on said second portion, and means responsive to float member fluctuation and coupled to said indicator means for actuating said alarm means upon abnormally large fluctuation of said float member, wherein testing of said alarm means may be accomplished by moving said second housing portion relative to said first housing portion to cause said alarm means to impinge upon said alarm actuating means and thereby simulate an abnormal float fluctuation.

5. In combination, a tank having an aperture in a wall thereof, liquid within said tank, a float in said liquid within said tank, a tubular member extending through said aperture, a housing exterior of said tank including a non-magnetic member affixed to and closing the end of tubular member, packing means for hermetically sealing between said tubular member and said tank while permitting relative motion therebetween, a driving shaft rotatably mounted within and relative to said tubular member, means within said tank actuated by movement of said float for rotatably driving said shaft, a driving magnet affixed to said driving shaft adjacent said non-magnetic member, a driven shaft coaxial with said driving shaft and rotatably mounted within said housing, means for mounting said housing on said wall of said tank so that said housing and said tubular member are rotatable relative to said tank and to said driving and driven shafts about the axis of said shafts, means carried by said driven shaft for indicating the level of said liquid within said tank, a driven magnet secured to said driven shaft within said housing and magnetically coupled to said driving magnet for movement therewith, an alarm switch supported within said housing and movable with said housing, an alarm switch actuating member carried by said driven shaft within said housing and being adapted to operate said alarm switch at a predetermined position of said float, whereby testing of said alarm may be accomplished by rotating said housing relative to said tank and to said driving and driven shafts and to said alarm switch actuating member to cause said actuating member to operate said alarm switch and thereby simulate movement of said float to said predetermined position.

6. In an electrical transformer including a tank having an aperture in a wall thereof and containing an insulating dielectric liquid and an alarm gauge of the magnetic-driven, liquid-level type provided with an electrical switch actuated to give an alarm when a float in the liquid is moved to a predetermined position and said gauge includes a housing exterior of said tank fixedly supporting said electrical switch and rotatably supporting a member movable relative to said housing for actuating said switch and also includes a tubular portion extending through said aperture and enclosing means for operatively connecting said float to said switch actuating member; the improvement comprising annular flange means on said tank wall in surrounding relation to said aperture, packing means for hermetically sealing between said annular flange means and said tubular portion of said gauge housing while permitting relative motion therebetween, and means for mounting said gauge housing on said tank wall so that it is normally stationary but rotatable about the axis of said tubular portion relative to said tank and to said switch actuating member, whereby testing of said alarm may be accomplished by rotating said gauge housing relative to said tank and to said switch actuating member to thereby cause said switch to engage said switch actuating member and thereby simulate movement of said float to said predetermined position.

7. In an electrical transformer including a housing having an aperture in a wall thereof and filled with an insulating dielectric liquid and a magnetic-driven, liquid level gauge wherein a gauge housing exterior of the transformer housing fixedly supports an alarm switch and rotatably supports a pointer for indicating the level of the liquid within the transformer housing and a member coupled to the pointer for actuating said switch and said gauge housing also includes a tubular member extending through said aperture and enclosing a driving magnet and means operatively connecting said driving magnet to a float in said liquid, the improvement comprising means affixed to said transformer housing defining an annular stuffing box chamber circumjacent said aperture and said tubular member, packing means within said chamber, a packing gland secured to said transformer housing for compressing said packing means within said chamber, one of said housings having a plurality of arcuate slots, and means including headed members carried by the other housing and fitting within said arcuate slots for mounting said gauging housing on said transformer housing so as to permit relative rotation therebetween, whereby said gauge may be tested by actuating said gauge housing relative to said transformer housing to bring said switch into engagement with said switch actuating member and thus simulate movement of said float to an extreme position.

References Cited by the Examiner

UNITED STATES PATENTS 1,782,454   11/30   Arnold.
2,620,412   12/52   Ford _____ 73—341 X ISAAC LISANN, *Primary Examiner.*